US008614717B2

(12) United States Patent
Huang et al.

(10) Patent No.: US 8,614,717 B2
(45) Date of Patent: Dec. 24, 2013

(54) DEVICE AND METHOD FOR SELECTING IMAGE PROCESSING FUNCTION

(75) Inventors: Wen-Cheng Huang, Taoyuan County (TW); Chiu-Sung Chen, Taoyuan (TW)

(73) Assignee: Hannstar Display Corporation, New Taipei (TW)

( * ) Notice: Subject to any disclaimer, the term of this patent is extended or adjusted under 35 U.S.C. 154(b) by 342 days.

(21) Appl. No.: 12/797,064

(22) Filed: Jun. 9, 2010

(65) Prior Publication Data

US 2011/0096080 A1 Apr. 28, 2011

(30) Foreign Application Priority Data

Oct. 26, 2009 (TW) ................................ 98136244 A

(51) Int. Cl.

*G06T 1/60* (2006.01)
*G09G 5/00* (2006.01)
*G09G 5/02* (2006.01)

(52) U.S. Cl.

USPC ............................ 345/530; 345/204; 345/699

(58) Field of Classification Search

USPC .................................. 345/204, 530, 698, 699
See application file for complete search history.

(56) References Cited

U.S. PATENT DOCUMENTS

| | | | | |
|---|---|---|---|---|
| 5,335,322 | A * | 8/1994 | Mattison | 345/542 |
| 5,796,439 | A * | 8/1998 | Hewett et al. | 348/459 |
| 5,990,965 | A | 11/1999 | Herz et al. | |
| 6,130,660 | A | 10/2000 | Imsand | |
| 7,046,262 | B2 * | 5/2006 | Feng et al. | 345/691 |
| 7,262,818 | B2 * | 8/2007 | Chuang et al. | 348/790 |
| 7,327,329 | B2 * | 2/2008 | Kobayashi et al. | 345/3.2 |
| 7,330,916 | B1 * | 2/2008 | Kirk | 710/52 |
| 2004/0130661 | A1 | 7/2004 | Jiang | |
| 2004/0239580 | A1 * | 12/2004 | Nagatani et al. | 345/1.3 |
| 2005/0225525 | A1 * | 10/2005 | Wu et al. | 345/89 |
| 2006/0187349 | A1 | 8/2006 | Tanigawa | |
| 2008/0316303 | A1 * | 12/2008 | Chiu et al. | 348/51 |
| 2010/0005396 | A1 * | 1/2010 | Nason et al. | 715/746 |

FOREIGN PATENT DOCUMENTS

| | | | |
|---|---|---|---|
| EP | 1560194 | A2 | 8/2005 |
| EP | 1607934 | A2 | 12/2005 |

* cited by examiner

*Primary Examiner* — Joni Richer
(74) *Attorney, Agent, or Firm* — Jianq Chyun IP Office

(57) ABSTRACT

A device for selecting an image processing function is provided. The device comprises an analog-to-digital converting unit outputting a first image in response to an image signal having a first frequency; a frame buffer unit having a frame buffering function; and an over-driving unit having an over-driving function, wherein the device for selecting the image processing function enables one of the frame buffering function and the over-driving function according to the first frequency.

10 Claims, 4 Drawing Sheets

DEVICE AND METHOD FOR SELECTING IMAGE PROCESSING FUNCTION

FIELD OF THE INVENTION

The present invention relates to the selection of the image processing function, and more particularly to the selection of the image processing function for the flat panel display.

BACKGROUND OF THE INVENTION

Due to the popularity of the digital television, the resolution of the image is upgraded from 720*480 pixels (NTSC) to 1920*1080 pixels (Full HD). This increases the size of the flat panel display. However, the way of driving liquid crystals is not improved accordingly. Hence, the response time of the frame is increased, which results in the afterimage for the television. Therefore, an over-driving method has been proposed below to improve the above-mentioned drawback.

Please refer to FIG. 1(*a*), which shows the first liquid crystal response time driven by the driving voltage in the prior art. There are two curves in FIG. 1(*a*), wherein the upper curve represents the waveform of the input driving voltage 11 and the lower curve represents the optical response curve of liquid crystals 12. $T_F$ represents the time for a frame, the transverse axle of the waveform of the input driving voltage 11 represents the time, the vertical axle of the waveform of the input driving voltage 11 represents the voltage, the transverse axle of the optical response curve of liquid crystals 12 represents the time, and the vertical axle of the optical response curve of liquid crystals 12 represents the gray scale.

Please refer to FIG. 1(*b*), which shows the second liquid crystal response time driven by the over-driving voltage in the prior art. There are two curves in FIG. 1(*b*), wherein the upper curve represents the waveform of the input over-driving voltage 13 and the lower curve represents the optical response curve of liquid crystals 14. In FIG. 1(*a*), when the input driving voltage is $V_D$, the first liquid crystal response time t1 is $3*T_F$. That is, it takes the time of three frames to reach the cut-off gray scale Grey 2 from the initial gray scale Grey1. However, in FIG. 1(*b*), when the input over-driving voltage is $V_{OD}$ which is larger than $V_D$, the second liquid crystal response time t2 is $T_F$. That is, it only takes the time of one frame to reach the cut-off gray scale Grey2 from the initial gray scale Grey 1. Although such driving method can reduce the response time of liquid crystals from t1 to t2, the liquid crystal panel cannot display normally when the vertical synchronization frequency of the television signal is larger than 60 Hz. Therefore, it is necessary to provide a method which can be used when the vertical synchronization frequency of the television signal is larger than 60 Hz.

In order to overcome the drawbacks in the prior art, a device for selecting an image processing function and the method thereof are provided. The particular designs in the present invention not only solve the problems described above, but also are easy to be implemented. Thus, the present invention has the utility for the industry.

SUMMARY OF THE INVENTION

In accordance with an aspect of the present invention, a method is provided to solve the problem that the liquid crystal panel cannot display normally when the vertical synchronization frequency of the television signal is larger than 60 Hz.

In accordance with another aspect of the present invention, a device for selecting an image processing function is provided. The device comprises an analog-to-digital converting unit outputting a first image in response to an image signal having a first frequency; a frame buffer unit having a frame buffering function; and an over-driving unit having an over-driving function, wherein the device for selecting the image processing function enables one of the frame buffering function and the over-driving function according to the first frequency.

Preferably, when the first frequency is smaller than or equal to a second frequency, the over-driving unit enables the over-driving function.

Preferably, the second frequency is 60 Hz.

Preferably, the device for selecting the image processing function is connected to a panel having a response time, the image signal further has an amplitude, and the over-driving function is performed to enhance the amplitude to reduce the response time.

Preferably, when the first frequency is larger than a second frequency, the frame buffer unit enables the frame buffering function.

Preferably, the first image is stored in the frame buffer unit for more than one time when the frame buffering function is enabled.

Preferably, the device further comprises a resolution-downgrade controller, wherein the first image has a resolution being one selected from a group consisting of a first resolution, a second resolution and a standard resolution, and the first resolution is reduced to the standard resolution by the resolution-downgrade controlling unit when the first image has the first resolution larger than the standard resolution.

Preferably, the standard resolution is a resolution of 1920*1080 pixels.

Preferably, the device further comprises a resolution-upgrade controller, wherein the second resolution is enhanced to the standard resolution by the resolution-upgrade controlling unit when the first image has the second resolution smaller than the standard resolution.

In accordance with a further aspect of the present invention, a device for selecting an image processing function is provided. The device comprises a scale controller processing an image signal according to a first frequency and outputting an image data; and a memory storing the image data in a way of first in first out.

Preferably, the scale controller has an over-driving function which is enabled when the first frequency is smaller than a second frequency, and the scale controller uses the over-driving function to process the image signal.

Preferably, the memory is a frame buffer unit having a capacity and a frame buffering function which is enabled by the scale controller when the first frequency is larger than the second frequency, and the scale controller uses the frame buffering function to store the image data.

Preferably, the image data has an image data quantity, and the frame buffer unit stores the image data in the way of first in first out when the image data quantity of the image data is larger than the capacity of the frame buffer unit.

In accordance with further another aspect of the present invention, a method of selecting an image processing function is provided. The method comprises steps of (a) receiving an image signal having a first frequency; (b) detecting a resolution of an image; (c) enabling one of an over-driving function and a frame buffering function according to the first frequency; and (d) storing the image in a way of first in first out when the frame buffering function is enabled.

Preferably, the method further comprises a step of (b1) reducing the resolution of the image to a predetermined resolution when the resolution of the image is larger than the predetermined resolution.

Preferably, the predetermined resolution is a resolution of 1920*1080 pixels.

Preferably, the method further comprises steps of (c1) enabling the over-driving function when the first frequency is smaller than or equal to a predetermined frequency; and (c2) enabling the frame buffering function when the first frequency is larger than the predetermined frequency.

Preferably, the predetermined frequency is 60 Hz.

Preferably, the method further comprises a step of (d1) enhancing the resolution of the image to a predetermined resolution when the resolution of the image is smaller than the predetermined resolution.

The above objects and advantages of the present invention will become more readily apparent to those ordinarily skilled in the art after reviewing the following detailed descriptions and accompanying drawings, in which:

BRIEF DESCRIPTION OF THE DRAWINGS

FIG. 1(*b*) shows the second liquid crystal response time driven by the over-driving voltage in the prior art;

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 2:
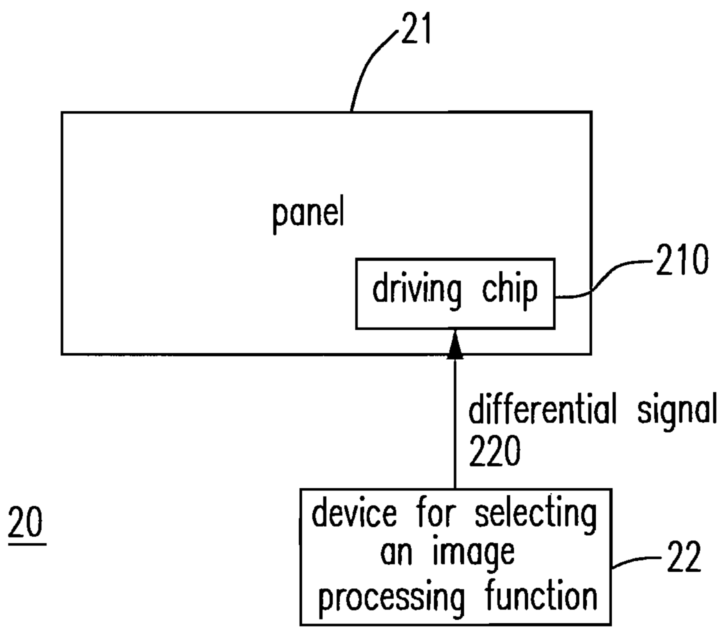
FIG. 2 shows the display system according to a preferred embodiment of the present invention.

Please refer to FIG. 2, which shows the display system according to a preferred embodiment of the present invention. The display system 20 includes a panel 21 and a device for selecting an image processing function 22. The panel 21 includes a driving chip 210. The device for selecting an image processing function 22 outputs a differential signal 220 to the panel 21, and the driving chip 210 receives the differential signal 220 and provides the driving voltage $V_D$ or the over-driving voltage $V_{OD}$ to enable the panel 21 to display images. The device for selecting an image processing function 22 selects an over-driving function or a frame buffering function thereinside.

Figure 3:
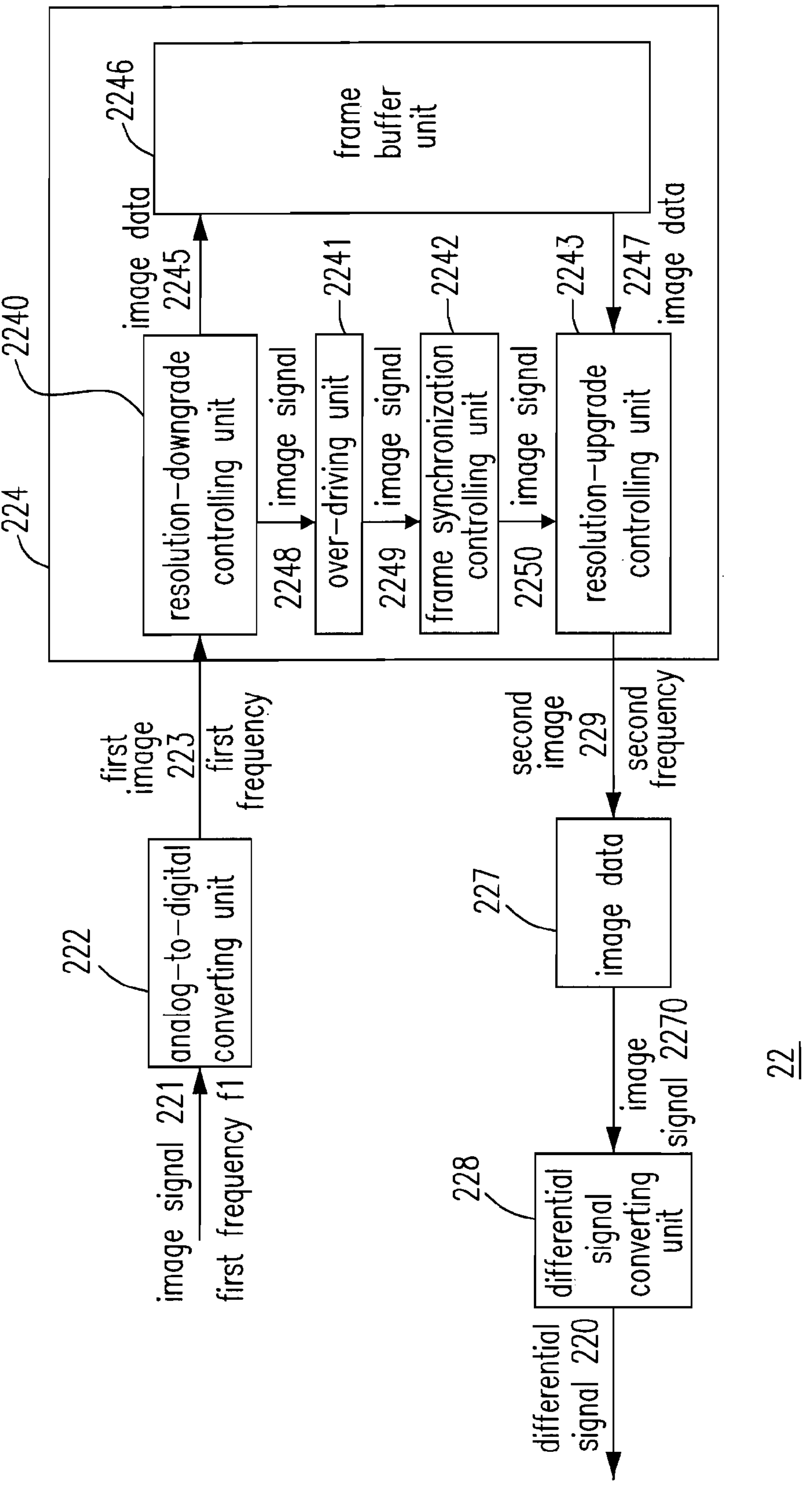
FIG. 3 shows the device for selecting an image processing function according to a preferred embodiment of the present invention.

Please refer to FIG. 3, which shows the device for selecting an image processing function according to a preferred embodiment of the present invention. The device for selecting an image processing function 22 includes an analog-to-digital converting unit 222, a scale controller 224, a frame buffer unit 2246, an image processor 227 and a differential signal converting unit 228. The scale controller 224 includes a resolution-downgrade controlling unit 2240, an over-driving unit 2241, a frame synchronization controlling unit 2242 and a resolution-upgrade controlling unit 2243.

The analog-to-digital converting unit 222 outputs a first image 223 in response to an image signal 221. The image signal 221 has a first frequency f1, and the magnitude of the vertical synchronization frequency of the first image 223 is equal to that of the first frequency f1 of the image signal 221. The frame buffer unit 2246 has a frame buffering function, and the over-driving unit 2241 has an over-driving function.

Figure 1A:
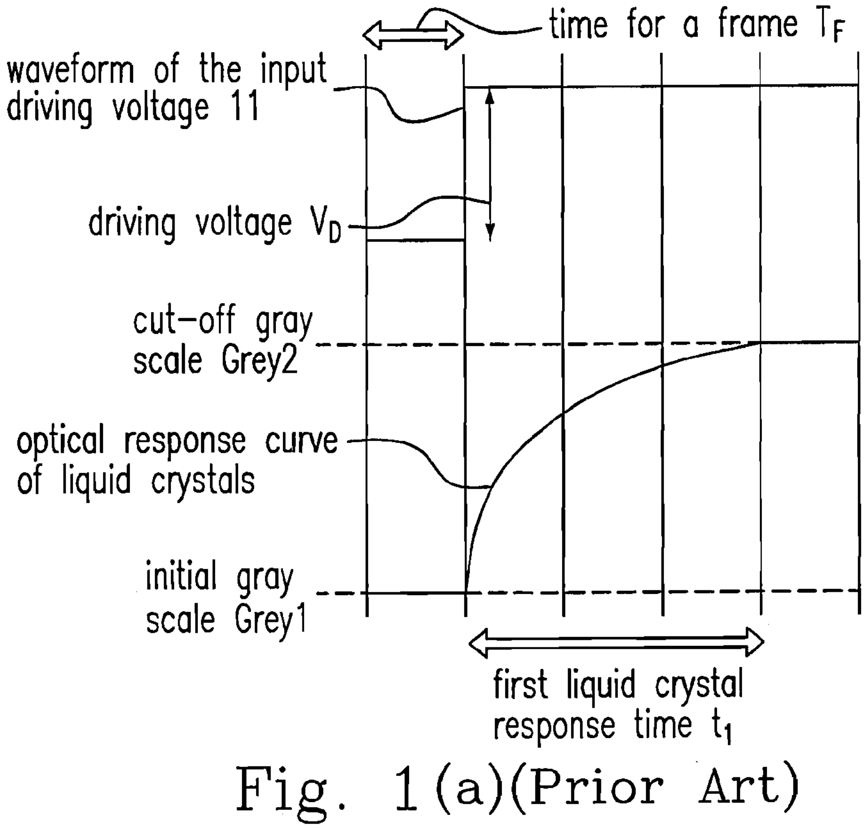
Fig. 1(a)(Prior Art)
FIG. 1(*a*) shows the first liquid crystal response time driven by the driving voltage in the prior art.
Figure 1B:
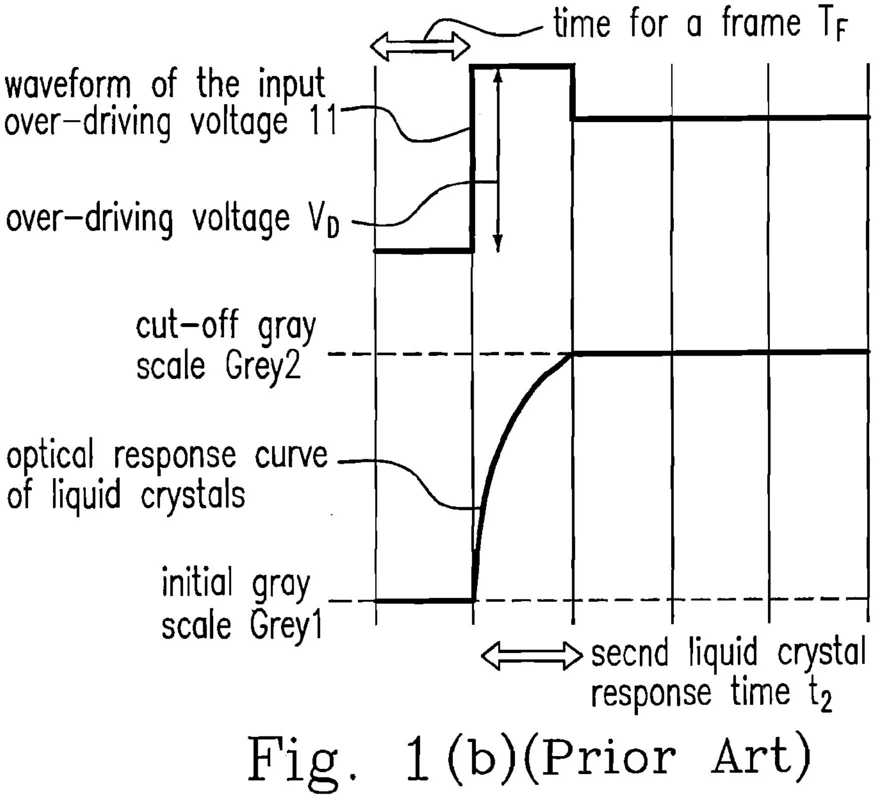
Fig. 1(b)(Prior Art)

Please refer to FIGS. 1(*a*), 1(*b*), 2 and 3. The device for selecting an image processing function 22 is connected to the panel 21. The panel 21 has the first liquid crystal response time t1, and the image signal 221 has an amplitude. The over-driving function is to increase the amplitude so as to reduce the first liquid crystal response time t1 of the panel 21 to the second liquid crystal response time t2.

The first image 223 has a resolution being one selected from a group consisting of a first resolution, a second resolution and a standard resolution. When the resolution of the first image 223 is the first resolution which is larger than the standard resolution, it is reduced from the first resolution to the standard resolution by the resolution-downgrade controlling unit 2240. The standard resolution is the resolution of 1920*1080 pixels. When the resolution of the first image 223 is the second resolution which is smaller than the standard resolution, it is enhanced from the second resolution to the standard resolution by the resolution-upgrade controlling unit 2243. When the resolution of the first image 223 is the standard resolution, no adjustment is made.

The device for selecting an image processing function 22 enables one of the over-driving function and the frame buffering function according to the first frequency f1. When the first frequency f1 is smaller than or equal to a second frequency, the scale controller 224 enables the over-driving function. The magnitude of the vertical synchronization frequency of the image signal 221 is equal to that of the first frequency f1, and the second frequency is 60 Hz. When the first frequency f1 is larger than the second frequency, the scale controller 224 enables the frame buffering function, and the resolution-downgrade controlling unit 2240 outputs an image data 2245 to the frame buffer unit 2246. The frame buffering function is to store the image data 2245 in the frame buffer unit 2246 in a way of first in first out. The frame buffer unit 2246 can be an SDRAM.

In the preferred embodiment of the present invention, the over-driving function or the frame buffering function is performed under the structure of the over-driving function. The capacity of the memory used under the structure of frame buffering is larger than that under the structure of the over-driving function. The capacity requirement of the memory can be reduced through the preferred embodiment of the present invention. When the over-driving function is used, the data quantity required for a pixel is smaller. In this case, under the standard resolution, a pixel includes three colors R, B, and each color includes four bits. Accordingly, the total data quantity for a frame is 1920*1080*3*4 bits=24883200 bits=3110 KB=3.1 MB. Hence, the memory capacity of 4 MB is sufficient to fulfill the requirement. When the frame buffering function is used under the structure of frame buffering, the data quantity required for a pixel is larger. In this case, under the standard resolution, a pixel includes three colors R, G, B, and each color includes 8 bits. Accordingly, the total data quantity for a frame is 1920*1080*3*8 bits=49766400 bits=6220 KB=6.22 MB. Hence, the memory capacity needs to be 8 MB to fulfill the requirement.

Therefore, the present invention stores the image data 2245 of larger than 4 MB in the frame buffer unit 2246 for more than one time in the way of first in first out. This can reduce the capacity requirement of the frame buffer unit 2246 for storing the image data 2245.

When the first frequency f1 is smaller than or equal to 60 Hz, the scale controller 224 enables the over-driving function. The resolution-downgrade controlling unit 2240 outputs an image signal 2248 to the over-driving unit 2241. The over-driving unit 2241 receives the image signal 2248 and outputs an image signal 2249. The frame synchronization controlling unit 2242 receives the image signal 2249 and outputs an image signal 2250 to the resolution-upgrade controlling unit 2243. The resolution-upgrade controlling unit 2243 receives the image signal 2250 and outputs a second image 229 to the image processor 227.

When the first frequency f1 is larger than 60 Hz, the scale controller 224 enables the frame buffering function. When the first frequency f1 is 75 Hz, the first image 223 includes 75 frames per second. Since the panel 21 can only accept 60 Hz, i.e. 60 frames per second, the frame buffer unit 2246 stores the data of 60 frames first and then outputs the image data 2247 to the resolution-upgrade controlling unit 2243. The remaining data of 15 frames are stored to the frame buffer unit 2246 in the next time. The image data 2247 includes the data of 60 frames. The resolution-upgrade controlling unit 2243 receives the image data 2247 and outputs the second image 229. The vertical synchronization frequency of the second image 229 is 60 Hz, i.e. the second frequency f2 is 60 Hz.

The frame synchronization controlling unit 2242 appropriately controls the vertical synchronization frequency of the image signal 2249, and then outputs the image signal 2250 to the resolution-upgrade controlling unit 2243. At this time, if the resolution of the first image 223 is smaller than the standard resolution, the resolution-upgrade controlling unit 2243 enhances the resolution of the first image 223 to the standard resolution.

When the first frequency f1 is smaller than or equal to 60 Hz and the resolution of the first image 223 is smaller than the standard resolution, the resolution-upgrade controlling unit 2243 enhances the resolution of the first image 223 to the standard resolution. When the first frequency f1 is larger than 60 Hz, the first image 223 is sequentially processed by the resolution-downgrade controlling unit 2240, the frame buffer unit 2246 and the resolution-upgrade controlling unit 2243 to enhance its resolution to the standard resolution.

The resolution-upgrade controlling unit 2243 outputs a second image 229 to the image processor 227. The image processor 227 processes the chrominance, brightness and overlapping frames of the second image 229, and compresses and decompresses the second image 229. The image processor 227 outputs an image signal 2270 to the differential signal converting unit 228. The differential signal converting unit 228 generates a differential signal and outputs it to the driving chip 210 of the panel 21 so as to enable the panel 21 to display images.

Figure 4:
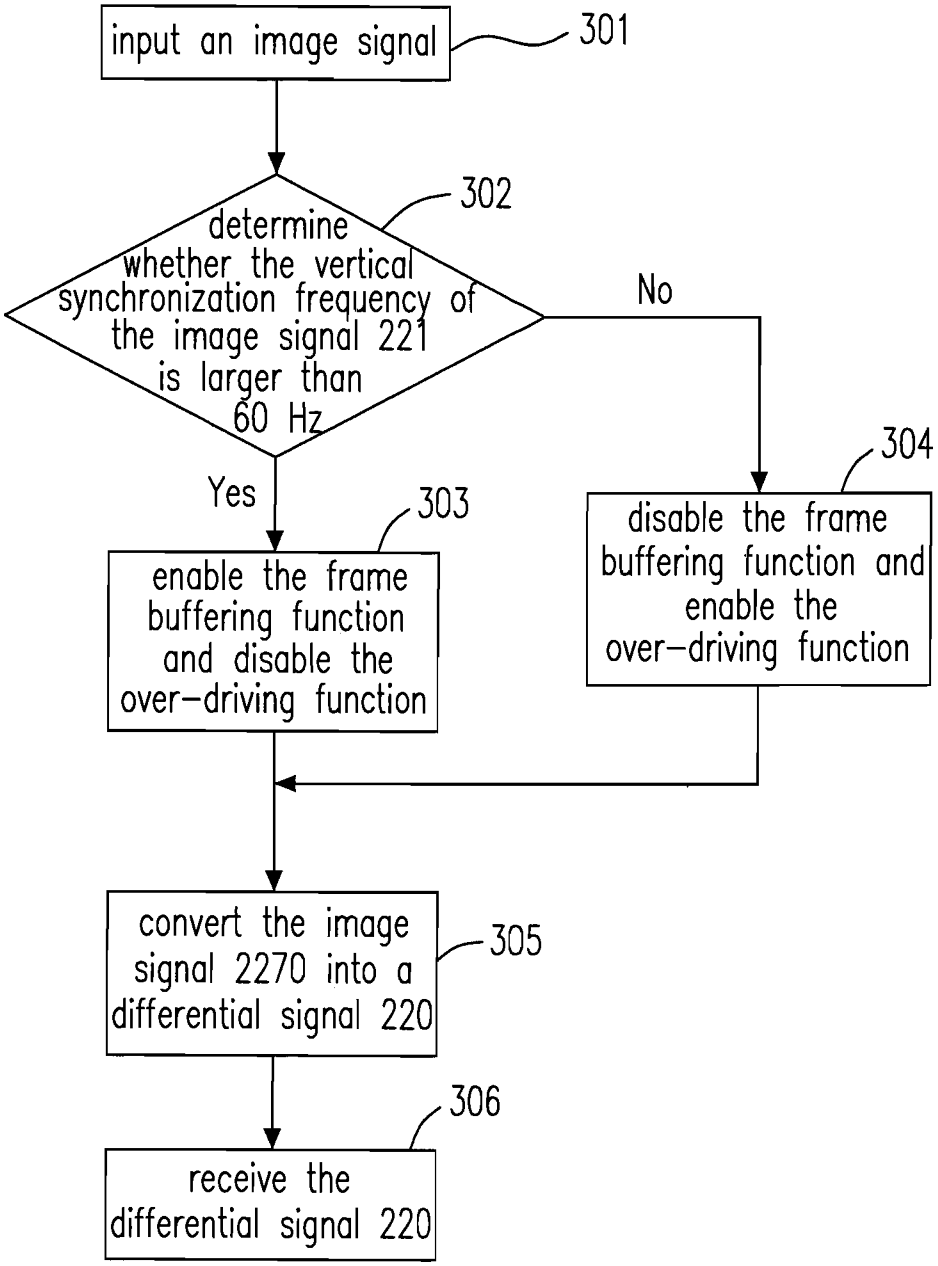
FIG. 4 shows the flowchart for selecting an image processing function according to a preferred embodiment of the present invention.

Please refer to FIG. 4, which shows the flowchart for selecting an image processing function according to a preferred embodiment of the present invention. In step 301, an image signal 221 is input to an analog-to-digital converting unit 222 and then converted into the first image 223. The magnitude of the vertical synchronization frequency of the image signal 221 is equal to that of the first frequency f1. The magnitude of the vertical synchronization frequency of the first image 223 is also equal to that of the first frequency f1. In step 302, whether the vertical synchronization frequency of the image signal 221, i.e. the first frequency f1, is larger than 60 Hz is determined. If the first frequency f1 is larger than 60 Hz, the flow goes to step 303; if the first frequency f1 is not larger than 60 Hz, the flow goes to step 304.

In step 303, when the first frequency f1 is larger than 60 Hz, the scale controller 224 enables the frame buffering function and disables the over-driving function. In step 304, when the first frequency f1 is smaller than or equal to 60 Hz, the scale controller 224 disables the frame buffering function and enables the over-driving function to reduce the response time of liquid crystals t1.

In step 305, the image signal 2270 is converted into a differential signal 220 by the differential signal converting unit 228. In step 306, the panel 21 receives the differential signal 220 and displays images.

According to the above-mentioned method, the over-driving function and the frame buffering function can coexist in a same device. In this way, the problem that the liquid crystal panel cannot display normally when the vertical synchronization frequency of the image signal 221 is larger than 60 Hz can be solved. Besides, the memory requirement of the frame buffer unit 2246 can be reduced.

Based on the above, the present invention can effectively solve the problems and drawbacks in the prior art, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A device for selecting an image processing function, comprising:

an analog-to-digital converting unit outputting a first image in response to an image signal having a first frequency;

a resolution-downgrade controlling unit, coupled to the analog-to-digital converting unit, wherein the first image has a resolution, and the resolution-downgrade controlling unit is configured to:

determine whether the resolution of the first image is equal to a standard resolution;

reduce the resolution of the first image to the standard resolution when the resolution of the first image is greater than the standard resolution, and then output the first image; and maintain the resolution of the first image to the standard resolution when the resolution of the first image is equal to the standard resolution, and then output the first image;

a frame buffer unit having a frame buffering function and coupled to the resolution-downgrade controlling unit, wherein when the frame buffering function is enabled under a vertical synchronization frequency of the first image is greater than a predetermined frequency, the frame buffer unit stores and outputs a part of image data of the first image from the resolution-downgrade controller;

an over-driving unit having an over-driving function and coupled to the resolution-downgrade controlling unit, wherein when the over-driving function is enabled under the vertical synchronization frequency of the first image is smaller than or equal to the predetermined frequency, the over-driving unit receives and performs an over-driving operation on the first image from the resolution-downgrade controller, and then outputs the first image;

a frame synchronization controlling unit, coupled to the over-driving unit, and configured to:

receive the first image from the over-driving unit; and control appropriately the vertical synchronization frequency of the first image and then output the first image;

a resolution-upgrade controlling unit, coupled to the frame buffer unit and the frame synchronization controlling unit, and configured to:

receive and determine whether the resolution of the first image from either the frame buffer unit or the frame synchronization controlling unit is equal to the standard resolution; and enhance the resolution of the first image to the standard resolution when the resolution of the first image from either the frame buffer unit or the frame synchronization controlling unit is smaller than the standard resolution, and then output a second image, wherein a vertical synchronization frequency of the second image is equal to the predetermined frequency;

an image processor, coupled to the resolution-upgrade controlling unit, and configured to receive and perform an image process on the second image from the resolution-upgrade controller, and then output a processed image-data information; and a differential signal converting unit, coupled to the image processor, and configured to receive and convert the processed image-data information, and then output a converted differential-signal information to a driving chip of a panel in a display system.

2. The device as claimed in claim 1, wherein the predetermined frequency is at least 60 Hz.

3. The device as claimed in claim 1, wherein the device for selecting the image processing function is connected to the panel having a response time, the image signal further has an amplitude, and the over-driving operation is performed to enhance the amplitude so as to reduce the response time.

4. The device as claimed in claim 1, wherein the first image is stored in the frame buffer unit for more than one time when the frame buffering function is enabled.

5. The device as claimed in claim 1, wherein the standard resolution is at least a resolution of 1920*1080 pixels.

6. The device as claimed in claim 1, wherein at least the resolution-downgrade controlling unit, the over-driving unit, the frame synchronization controlling unit, the resolution-upgrade controlling unit, and the frame buffer unit form a scale controller in the display system, such that the scale controller in the display system has the over-driving function, the frame buffering function and an image scaling function.

7. The device as claimed in claim 1, wherein the frame buffer unit stores the part of image data in a way of first in first out.

8. A method of selecting an image processing function, comprising the following steps of:

(a) receiving an image signal having a first frequency and converting the image signal into a first image having the first frequency;

(b) determining whether a resolution of the first image from the step (a) is equal to a standard resolution, wherein the step (b) comprises steps of:

(b1) reducing the resolution of the first image to the standard resolution when the resolution of the first image is greater than the standard resolution, and then outputting the first image; and (b2) maintaining the resolution of the first image to the standard resolution when the resolution of the first image is equal to the standard resolution, and then outputting the first image;

(c) enabling one of an over-driving function and a frame buffering function according to a vertical synchronization frequency of the first image, wherein the step (c) comprises steps of:

(c1) enabling the frame buffering function under the vertical synchronization frequency of the first image is greater than a predetermined frequency, and storing and outputting a part of image data of the first image from the step (b1);

(c2) enabling the over-driving function under the vertical synchronization frequency of the first image is smaller than or equal to the predetermined frequency, and performing an over-driving operation on the first image from the step (b2) and then outputting the first image;

(d) receiving the first image from the step (c2), and controlling appropriately the vertical synchronization frequency of the first image and then outputting the first image;

(e) receiving and determining whether the resolution of the first image from either the step (c1) or the step (d) is equal to the standard resolution;

(f) enhancing the resolution of the first image to the standard resolution when the resolution of the first image from either the step (c1) or the step (d) is smaller than the standard resolution, and then outputting a second image, wherein a vertical synchronization frequency of the second image is equal to the predetermined frequency;

(g) performing an image process on the second image from the step (f), and then outputting a processed image-data information; and (h) converting the processed image-data information, and then outputting a converted differential-signal information to a driving chip of a panel in a display system.

9. The method as claimed in claim 8, wherein the standard resolution is at least a resolution of 1920*1080 pixels.

10. The method as claimed in claim 8, wherein the predetermined frequency is at least 60 Hz.

* * * * *